(12) United States Patent
Lee et al.

(10) Patent No.: US 11,019,497 B2
(45) Date of Patent: May 25, 2021

(54) APPARATUS AND METHOD FOR MANAGING RISK OF MALWARE BEHAVIOR IN MOBILE OPERATING SYSTEM AND RECORDING MEDIUM FOR PERFORM THE METHOD

(71) Applicant: Korea University Research and Business Foundation, Seoul (KR)

(72) Inventors: Kyung Ho Lee, Seoul (KR); Dahee Choi, Seoul (KR); Won Park, Seoul (KR); Junhyoung Oh, Seoul (KR); Ju Hyeon Lee, Seoul (KR); Chang Yeon Kim, Seoul (KR); Youngin You, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 310 days.

(21) Appl. No.: 16/223,521

(22) Filed: Dec. 18, 2018

(65) Prior Publication Data

US 2019/0215697 A1 Jul. 11, 2019

(30) Foreign Application Priority Data

Dec. 18, 2017 (KR) .......................... 10-2017-0174459
Oct. 17, 2018 (KR) .......................... 10-2018-0123949

(51) Int. Cl.
*G06F 21/57* (2013.01)
*H04W 12/128* (2021.01)
(Continued)

(52) U.S. Cl.
CPC .......... *H04W 12/128* (2021.01); *G06F 21/56* (2013.01); *G06F 21/577* (2013.01); *G06N 20/00* (2019.01);
(Continued)

(58) Field of Classification Search
CPC ............. H04W 12/1208; H04L 63/101; H04L 63/1408; H04L 63/1433; G06F 21/56;
(Continued)

(56) References Cited

U.S. PATENT DOCUMENTS 8,201,257 B1 * 6/2012 Andres ................. G06F 21/568
726/25
8,782,792 B1 7/2014 Bodke
(Continued)

FOREIGN PATENT DOCUMENTS

KR 10-2011-0131093 A 12/2011
KR 10-2013-0071617 A 7/2013
(Continued)

OTHER PUBLICATIONS

Yuan et al. "Droid-Sec: Deep Learning in Android Malware Detection" [Online] Aug. 17-22, 2014 [Retrieved on: Dec. 19, 2020], SIGCOMM '14, www.acm.org, Retrieved from: < https://dl.acm.org/doi/pdf/10.1145/2619239.2631434 > (Year: 2014).*
(Continued)

*Primary Examiner* — Eric W Shepperd
(74) *Attorney, Agent, or Firm* — Hauptman Ham, LLP (57) ABSTRACT

Disclosed is an apparatus for managing a risk of a malware behavior in a mobile operating system, which includes: a deducing unit configured to deduce characteristics of a malware from results of a static analysis on mobile malware data and a dynamic analysis thereon under a virtual environment by using a blacklist including an indicator of compromise (IOC) utilized in an existing mobile malware.

10 Claims, 7 Drawing Sheets

(51) Int. Cl.
    *G06N 20/00*     (2019.01)
    *H04L 29/06*     (2006.01)
    *G06F 21/56*     (2013.01)

(52) U.S. Cl.
    CPC .... *H04L 63/1433* (2013.01); *G06F 2221/034* (2013.01); *H04L 63/101* (2013.01)

(58) Field of Classification Search
    CPC .... G06F 21/561; G06F 21/562; G06F 21/564; G06F 21/566; G06F 21/577; G06F 2221/034
    See application file for complete search history.

(56) References Cited

U.S. PATENT DOCUMENTS

| | | | | |
|---|---|---|---|---|
| 9,165,142 B1* | 10/2015 | Sanders | | H04L 63/1441 |
| 9,350,747 B2* | 5/2016 | McLarnon | | H04L 63/14 |
| 9,690,933 B1* | 6/2017 | Singh | | G06N 5/045 |
| 10,009,370 B1* | 6/2018 | Douglas | | G06F 21/563 |
| 2009/0077666 A1* | 3/2009 | Chen | | G06Q 10/0631 |
| | | | | 726/25 |
| 2011/0271341 A1* | 11/2011 | Satish | | G06F 21/562 |
| | | | | 726/23 |
| 2012/0079596 A1* | 3/2012 | Thomas | | G06F 21/566 |
| | | | | 726/24 |
| 2012/0180133 A1* | 7/2012 | Al-Harbi | | H04L 63/1433 |
| | | | | 726/25 |
| 2012/0233698 A1* | 9/2012 | Watters | | G06F 21/577 |
| | | | | 726/25 |
| 2013/0097706 A1* | 4/2013 | Titonis | | G06F 21/56 |
| | | | | 726/24 |
| 2014/0046863 A1* | 2/2014 | Gifford | | G06Q 10/10 |
| | | | | 705/325 |
| 2014/0137257 A1* | 5/2014 | Martinez | | H04L 63/1433 |
| | | | | 726/25 |
| 2014/0181897 A1* | 6/2014 | Zaitsev | | G06F 21/566 |
| | | | | 726/1 |
| 2015/0026810 A1* | 1/2015 | Friedrichs | | H04L 63/1416 |
| | | | | 726/23 |
| 2015/0199512 A1* | 7/2015 | Kim | | G06F 21/566 |
| | | | | 726/23 |
| 2016/0065601 A1* | 3/2016 | Gong | | H04L 63/1416 |
| | | | | 726/23 |
| 2016/0110543 A1* | 4/2016 | Park | | G06F 21/563 |
| | | | | 726/22 |
| 2016/0267270 A1* | 9/2016 | Lee | | H04W 4/12 |
| 2017/0054738 A1* | 2/2017 | Avidan | | H04L 63/1416 |
| 2017/0083703 A1* | 3/2017 | Abbasi | | G06F 21/561 |
| 2017/0262629 A1* | 9/2017 | Xu | | H04L 63/1425 |
| 2017/0366582 A1* | 12/2017 | Kothekar | | H04L 63/101 |
| 2020/0097663 A1* | 3/2020 | Sato | | H04L 67/12 |

FOREIGN PATENT DOCUMENTS

| | | |
|---|---|---|
| KR | 10-2014-0102287 A | 8/2014 |
| KR | 10-2015-0084123 | 7/2015 |
| KR | 10-2015-0188697 A | 12/2015 |
| KR | 10-1803889 B1 | 12/2017 |

OTHER PUBLICATIONS

Korean Office Action dated Jul. 17, 2019 in connection with counterpart Korean Patent Application No. 10-2018-0123949, citing the above references.

\* cited by examiner

| Behavior | Installation | | | | | Activation | | | | | | | | |
|---|---|---|---|---|---|---|---|---|---|---|---|---|---|---|
| | Repackaging | Update | Drive-by Download | Standalone | BOOT | SMS | NET | CALL | USB | PKG | BATT | SYS | MAIN |
| Malware Name (example) | | | | | | | | | | | | | |
| AnserverBot | | | | | | | | | | | | | |
| Asroot | | | | | | | | | | | | | |
| BaseBridge | | | | | | | | | | | | | |
| BeanBot | | | | | | | | | | | | | |
| BgServ | | | | | | | | | | | | | |
| CoinPirate | | | | | | | | | | | | | |
| Crusewin | | | | | | | | | | | | | |
| DogWars | | | | | | | | | | | | | |
| DroidDeluxe | | | | | | | | | | | | | |
| DroidDream | | | | | | | | | | | | | |
| DroidDreamLight | | | | | | | | | | | | | |
| DroidKungFu1 | | | | | | | | | | | | | |
| DroidKungFu2 | | | | | | | | | | | | | |

FIG. 3

| ① Asset Value (Asset Level) | ② Threat (Threat Level) |||||||||
|---|---|---|---|---|---|---|---|---|---|
| | Low ||| Medium ||| High |||
| Very Low | 0 | 1 | 2 | 1 | 2 | 3 | 2 | 3 | 4 |
| Low | 1 | 2 | 3 | 2 | 3 | 4 | 3 | 4 | 5 |
| Medium | 2 | 3 | 4 | 3 | 4 | 5 | 4 | 5 | 6 |
| High | 3 | 4 | 5 | 4 | 5 | 6 | 5 | 6 | 7 |
| Very High | 4 | 5 | 6 | 5 | 6 | 7 | 6 | 7 | 8 |
| | L | M | H | L | M | H | L | M | H |
| ③ Vulnerability (Vulnerable Point) ||||||||||

FIG. 4

| | | \multicolumn{5}{c}{Vulnerability} |
|---|---|---|---|---|---|---|
| T E F | VH | M | H | VH | VH | VH |
| | H | L | M | H | H | H |
| | M | VL | L | M | M | M |
| | L | VL | VL | L | L | L |
| | VL | VL | VL | VL | VL | VL |
| Loss Event Frequency | | VL | L | M | H | VH |

FIG. 5

| Rating | Range Low End | Range High End |
|---|---|---|
| Very High (VH) | 90% | 100% |
| High (H) | 70% | 90% |
| Medium (M) | 30% | 70% |
| Low (L) | 10% | 30% |
| Very Low (VL) | 0% | 10% |

APPARATUS AND METHOD FOR MANAGING RISK OF MALWARE BEHAVIOR IN MOBILE OPERATING SYSTEM AND RECORDING MEDIUM FOR PERFORM THE METHOD

CROSS-REFERENCE TO RELATED APPLICATION

This application claims priority to Korean Patent Application No. 10-2017-0174459, filed on Dec. 18, 2017, and Korean Patent Application No. 10-2018-0123949, filed on Oct. 17, 2018, all the benefits accruing therefrom under 35 U.S.C. § 119, the contents of which in its entirety are herein incorporated by reference.

BACKGROUND

1. Field

The present disclosure relates to an apparatus and method for managing a risk of a malware behavior in a mobile operating system, and a recording medium for performing the method, and more particularly to a method for managing a risk of a malware behavior in a mobile operating system, which is implemented to prepare for an attack of an unknown new mobile malware.

2. Description of the Related Art

Machine learning is a field of artificial intelligence that refers to the areas in which algorithms and techniques are developed to enable a computer to learn. For example, a computer may be trained through machine learning to classify whether a received e-mail is a spam mail or not.

The influx of malware in the mobile environment is rapidly increasing, and it becomes more important to detect and predict a malware behavior under the mobile environment since the malware may cause monetary damage.

Korean Patent Application No. 10-2015-0188697 discloses a malware detection method, which checks whether the data received from the outside has a malware, transmits the checking result to a server, determines whether or not to permit based on the blacklist data of the server and the access authorization information, and then sends the determination result to a user mobile terminal. The user terminal allows or blocks the data received from the outside based on the data received from the server.

Also, Korean Patent Application No. 10-2014-0102287 discloses a method for measuring a user recognition avoidance degree for a mobile application behavior during a virtual machine-based application dynamic analysis. More particularly, this application proposes a method for measuring a user recognition avoidance degree for a mobile application behavior during an application dynamic analysis based on a virtual machine that is capable of detecting a malware behavior according to a user recognition rate to the execution of the application.

In addition, U.S. Pat. No. 8,782,792B1 discloses a computer implementation method for detecting a malware on a mobile platform, which includes the step of receiving a malware evaluation result performed by a security server using emulation information. Here, a security action may be performed based on the malware evaluation result. Also, the method may be applied to various other methods and systems, media readable by a computer, and the like.

Moreover, Korean Patent Application No. 10-2011-0131093 discloses a device that includes a malware behavior pattern generation unit for generating a malware behavior pattern by patterning an application programming interface (API) list of a mobile malware behavior application and an API call sequence, and a malware behavior analyzer for analyzing based on the malware behavior pattern whether the analyzed application has a malware behavior.

However, since the existing mobile malware detection methods are based on rule-based or blacklist-based methods, it is only possible to detect known attacks. Thus, there is needed to develop a classification technique capable of preparing for unknown new mobile attacks.

RELATED LITERATURES

Patent Literature (Patent Literature 1) Korean Unexamined Patent Publication No. 10-2015-0188697
(Patent Literature 2) Korean Unexamined Patent Publication No. 10-2014-0102287
(Patent Literature 3) US Patent Publication U.S. Pat. No. 8,782,792B1
(Patent Literature 4) Korean Unexamined Patent Publication No. 10-2011-0131093

SUMMARY

The present disclosure is designed based on the above, and the present disclosure is directed to providing an apparatus and method for managing a risk of a malware behavior in a mobile operating system, which is implemented to prepare for an attack of an unknown new mobile malware, and a recording medium for performing the method.

The technical subject of the present disclosure is not limited to the above, and other technical subjects not mentioned herein may be clearly understood by those skilled in the art from the following disclosure.

In one aspect of the present disclosure, there is provided an apparatus for managing a risk of a malware behavior in a mobile operating system, comprising: a deducing unit configured to deduce characteristics of a malware from results of a static analysis on mobile malware data and a dynamic analysis thereon under a virtual environment by using a blacklist including an indicator of compromise (IOC) utilized in an existing mobile malware, and then select a characteristic highly relevant to the mobile malware data among the deduced characteristics; a classifying unit configured to classify a malware behavior using the characteristics selected by the deducing unit by applying a machine learning algorithm to mobile data; a calculating unit configured to select asset value, threat and vulnerability for the classified malware behavior and apply the same to a risk management model, and classify a main risk group and a secondary risk group to calculate a risk degree; and a verifying unit configured to verify the efficiency of a mobile malware detecting process for the result of the calculating unit and store the verification result in a database.

In an embodiment of the present disclosure, the apparatus may further comprise a determining unit configured to determine a combination with a highest detection ratio as the mobile malware detection process, based on the verification result of the verifying unit for all combinable mobile data sets with different criteria.

In an embodiment of the present disclosure, the asset value selected by the calculating unit may include at least one of a user, an application and a system, which are attack targets defined in the IOC, as an importance of a domain executable by the malware.

In an embodiment of the present disclosure, the threat selected by the calculating unit may include at least one of installation, activation, malicious payload and overview from an attacker, which are possible attacks to the asset value, as malware behavior information to which a weight is endowed by machine learning.

In an embodiment of the present disclosure, the vulnerability selected by the calculating unit may include at least one of cookie information, e-mail information and system information, which are detailed items for the criteria of the IOC classified in the asset value, as classification information of specific behaviors on the asset value.

In an embodiment of the present disclosure, the apparatus may further comprise a visualizing unit configured to express the risk degree with at least one of ratio, color and graph.

In another aspect of the present disclosure, there is also provided a method for managing a risk of a malware behavior in a mobile operating system, comprising: deducing characteristics of a malware from results of a static analysis on mobile malware data and a dynamic analysis thereon under a virtual environment by using a blacklist including an indicator of compromise (IOC) utilized in an existing mobile malware, and then calculating a characteristic highly relevant to the mobile malware data among the deduced characteristics; classifying a malware behavior using the selected characteristics by applying a machine learning algorithm to mobile data; selecting asset value, threat and vulnerability for the classified malware behavior and applying the same to a risk management model, and classifying a main risk group and a secondary risk group to calculate a risk degree; and verifying the efficiency of a mobile malware detecting process for the calculation result and storing the verification result in a database.

In an embodiment of the present disclosure, the method may further comprise determining a combination with a highest detection ratio as the mobile malware detection process, based on the verification result for all combinable mobile data sets with different criteria.

In an embodiment of the present disclosure, the method may further comprise expressing the risk degree with at least one of ratio, color and graph.

In another aspect of the present disclosure, there is also provided a computer-readable recording medium, on which a computer program for executing the method for managing a risk of a malware behavior in a mobile operating system is recorded.

According to an embodiment of the present disclosure as described above, a malware is detected by reflecting the characteristics of data in a mobile operating system, and if there is an unknown new mobile malware, it is possible to detect a potential malware whose malware behavior may not be determined.

In addition, since all the possible data sets and references are verified, it is possible to determine the combination with a highest detection ratio as a detection process, which ensures more quick and accurate detection afterwards.

The effects of the present disclosure are not limited to the above, and other effects not mentioned herein will be clearly understood by those skilled in the art from the following disclosure.

DETAILED DESCRIPTION

The present disclosure will be described in detail with reference to the accompanying drawings which illustrate, by way of example, specific embodiments in which the present disclosure may be implemented. These embodiments are described in sufficient detail to enable those skilled in the art to implement the present disclosure. It should be understood that various embodiments of the present disclosure are different from each other but need not be mutually exclusive. For example, specific features, structures and characteristics described herein may be implemented in other embodiments without departing from the scope of the present disclosure in connection with one embodiment. It should also be understood that the position or arrangement of individual components in each embodiment may be varied without departing from the scope of the present disclosure. Therefore, the following detailed description is not taken to limit the present disclosure, and the scope of the present disclosure is limited only by the appended claims, along with the full scope of equivalents to which such claims are entitled. In the drawings, like reference signs refer to the same or similar functions throughout several aspects.

Hereinafter, preferred embodiments of the present disclosure will be described in more detail with reference to the drawings.

Figure 1:
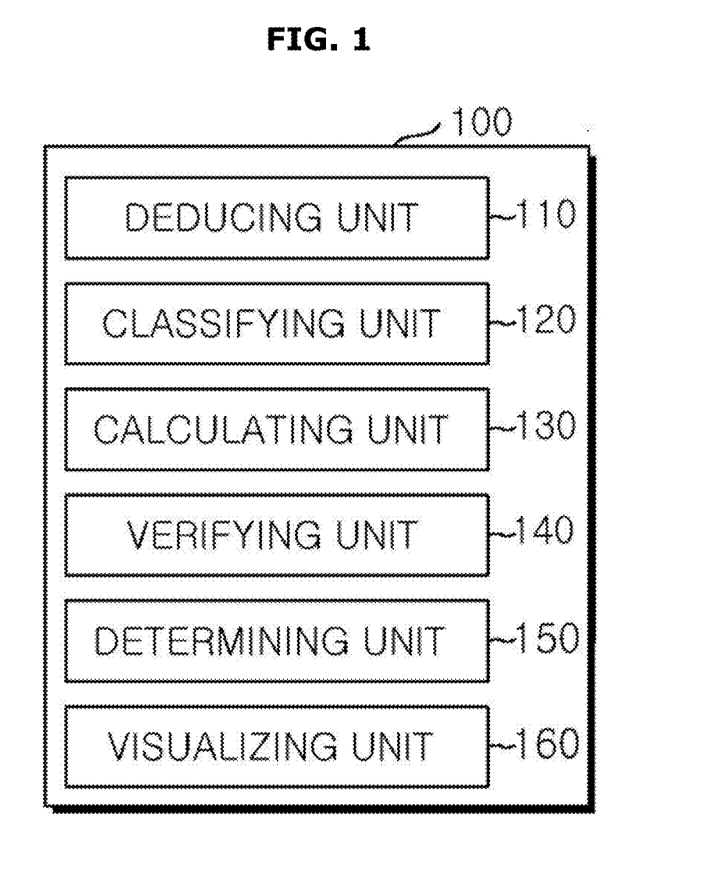
FIG. 1 is a block diagram showing an apparatus for managing a risk of a malware behavior in a mobile operating system according to an embodiment of the present disclosure.

FIG. 1 is a block diagram showing an apparatus for managing a risk of a malware behavior in a mobile operating system according to an embodiment of the present disclosure.

Figure 2:
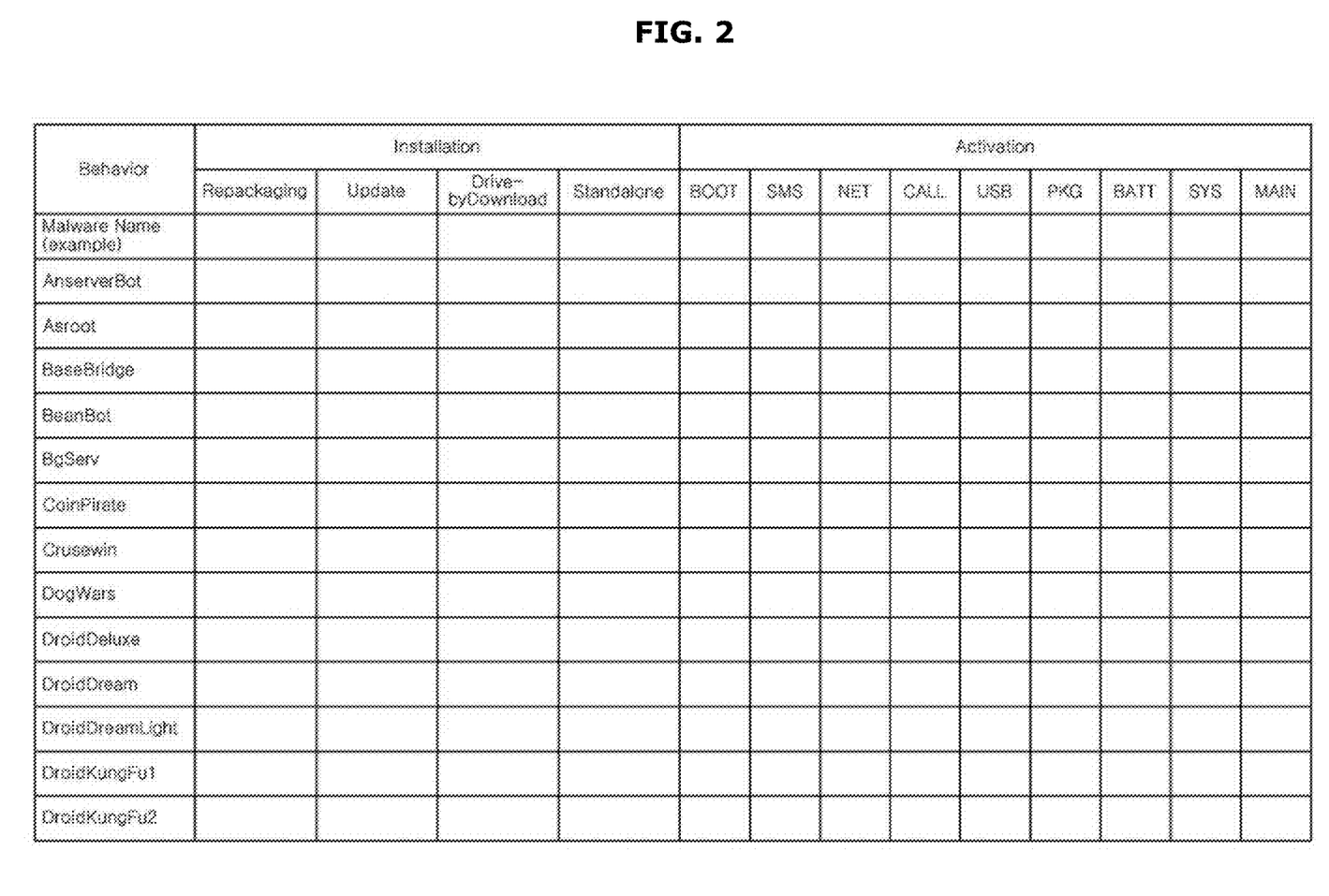
FIG. 2 is a diagram for illustrating an example of classifying characteristics of an asset value of a mobile malware according to the present disclosure.

FIG. 2 is a diagram for illustrating an example of classifying characteristics of an asset value of a mobile malware according to the present disclosure.

Figure 3:
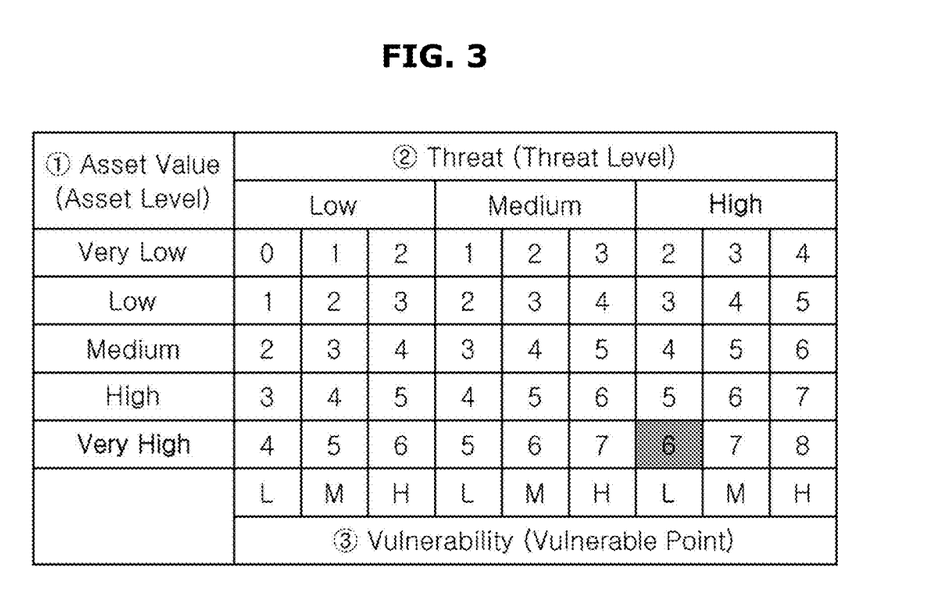
FIG. 3 is a diagram for illustrating an example of classifying malware behaviors of mobile malwares to calculate a risk degree according to the level of asset value, threat and vulnerability according to the present disclosure.

FIG. 3 is a diagram for illustrating an example of classifying malware behaviors of mobile malwares to calculate a risk degree according to the level of asset value, threat and vulnerability according to the present disclosure.

Figure 4:
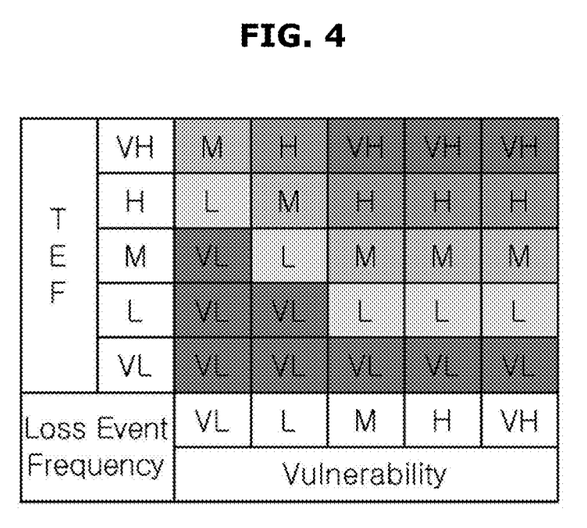
FIG. 4 is a diagram for illustrating an example of displaying a risk degree with colors only for threat and vulnerability according to the present disclosure.

FIG. 4 is a diagram for illustrating an example of displaying a risk degree with colors only for threat and vulnerability according to the present disclosure.

Figure 5:
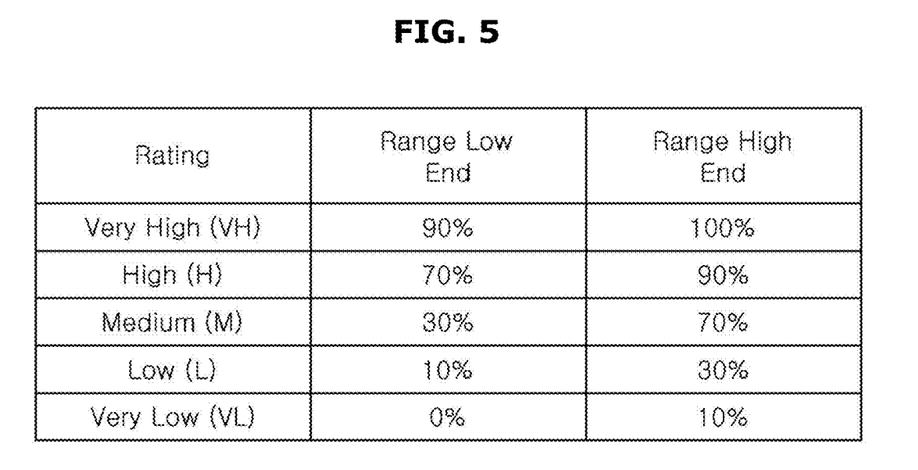
FIG. 5 is a diagram for illustrating an example of displaying a calculated risk degree in a proportion according to the present disclosure.

FIG. 5 is a diagram for illustrating an example of displaying a calculated risk degree in a proportion according to the present disclosure.

Referring to FIGS. 1 to 5, an apparatus 100 for managing a risk of a malware behavior in a mobile operating system according to an embodiment of the present disclosure may include a deducing unit 110, a classifying unit 120, a calculating unit 130 and a verifying unit 140, and may further include at least one of a determining unit 150 and a visualizing unit 160. The risk management apparatus 100 of the present disclosure may be a separate terminal or a module of a terminal. The deducing unit 110, the classifying unit 120, the calculating unit 130, the verifying unit 140, the determining unit 150 and the visualizing unit 160 shown in FIG. 1 may be provided as an integrated module or may be composed of one or more modules. However, each unit may be a separate module, contrary to the above.

A software (application) for performing a work storage capacity measurement may be installed and executed at the risk management apparatus 100 of the present disclosure, and the deducing unit 110, the classifying unit 120, the calculating unit 130, the verifying unit 140, the determining unit 150 and the visualizing unit 160 may be controlled by a software executed at the risk management apparatus 100.

The deducing unit 110 performs a static analysis on mobile malware data and a dynamic analysis thereon under a virtual environment, and deduces characteristics of a malware from the analysis results based on a blacklist such as an indicator of compromise (IOC) utilized in an existing mobile malware. The deducing unit 110 selects a characteristic highly relevant the existing mobile malware from the deduced mobile malware data.

The classifying unit 120 classifies a malware behavior using the characteristics selected by the deducing unit 110 by applying a machine learning algorithm to the mobile data. FIG. 2 shows an example of a criterion for classifying the characteristics for the asset value of mobile malware.

The calculating unit 130 selects asset value, threat and vulnerability for the malware behavior classified by the classifying unit 120 and applies the same to a risk management model, and also classifies a main risk group and a secondary risk group to calculate a risk degree.

The asset value means an importance of a domain executable by the malware, and may be briefly classified into a user, an application and a system according to attack targets defined in the IOC.

Among them, the application means an Internet address (URL, Uniform Resource Locator), e-mail service, file download and the like, and the system means a network, a driver, a registry, a process, a file, a disk and the like.

The threat means malware behavior information to which a weight is endowed by machine learning, and possible attacks to the asset value by an attacker may be classified according to behaviors such as installation, activation, malicious payload and overview.

The installation generates a threat to the asset value by installing a specific program, and means repackaging, update, drive-by-download, standalone program and the like.

The activation generates a threat to the asset value by activating a function of a specific program installed in advance, and means a short message service (SMS), a universal serial bus (USB), a battery (BAT), a system (SYS), boot and the like.

The malicious payload generates a threat to the asset value by using a malware behavior associated with a service frequently used by the user, and is classified into privilege escalation, remote control, financial charges, personal information stealing and the like.

Among them, the privilege escalation means Exploit, Encrypted and the like, and the remote control means a network, a short message service (SMS) and the like. The financial charges uses a phone call or a SMS, and the personal information stealing uses a SMS, a phone number and the like.

The overview generates a threat to the asset value by using a malware behavior on a network, a system or the like over a specific terminal level, and is classified into user account, encrypted, Root Exploit including rage against the case (RATC), Command & Control, malware component and the like.

The vulnerability is classification information on detailed behaviors of the asset value, and detail items are selected based on about 500 possible behaviors for the criteria of the IOC classified in the asset value.

For example, the cookie means a history explorer name, a history explorer version, a history cookie name, a history filename and the like, and the e-mail means attachment information, e-mail address standard of an attachment (MIME), reference, sender and receiver addresses (IP) and the like. Also, the system means MAC address, BIOS date, BIOS version, network adaptor, network internet protocol address and the like.

In the case where the malware behavior classified from the derived characteristics is a malware A as a result of the analysis that attacks a network subnet of the mobile device very frequently, the risk degree may be calculated as follows. This example will be described with reference to FIG. 3.

(1) Since the network subnet is included in the system, the malware A has a high risk degree, so the asset value is selected as Very High.

(2) Since the malware A is recognized very frequently, the threat is selected as High.

(3) Since the network subnet has a relatively low importance among IPs (Internet Protocols) used by a mobile device, the vulnerability is selected as L (Low).

(4) Seeing FIG. 3 depicting three kinds of information, namely the asset value, the threat and the vulnerability, the risk degree is calculated as 6.

The verifying unit 140 verifies the efficiency of a mobile malware detecting process in consideration of the time spent in the deducing unit 110, the classifying unit 120 and the calculating unit 130, a used resource, a detection ratio and the like, and stores the same in a database.

The determining unit 150 determines a combination with a highest detection ratio as the mobile malware detection process, based on the verification result of the verifying unit 140 for all combinable mobile data sets and criteria.

The visualizing unit 160 expresses the risk degree by using ratios, colors, graphs or the like so that the risk degree may be intuitively recognized in the risk management for classifying asset value, threat and vulnerability into a mobile malware risk group.

For example, FIG. 4 shows risk degree classification according to color, only for the threat and the vulnerability. Here, each risk degree is indicated by a unique color so that the risk may be comprehensively recognized.

As another example, FIG. 5 expresses the risk degree classification according to ratios. The risk degree is displayed based on the final result considering the asset value, the threat and the vulnerability together. Here, it may be recognized that the risk degree in the top 10% has a grade of VH (Very High).

Figure 6:
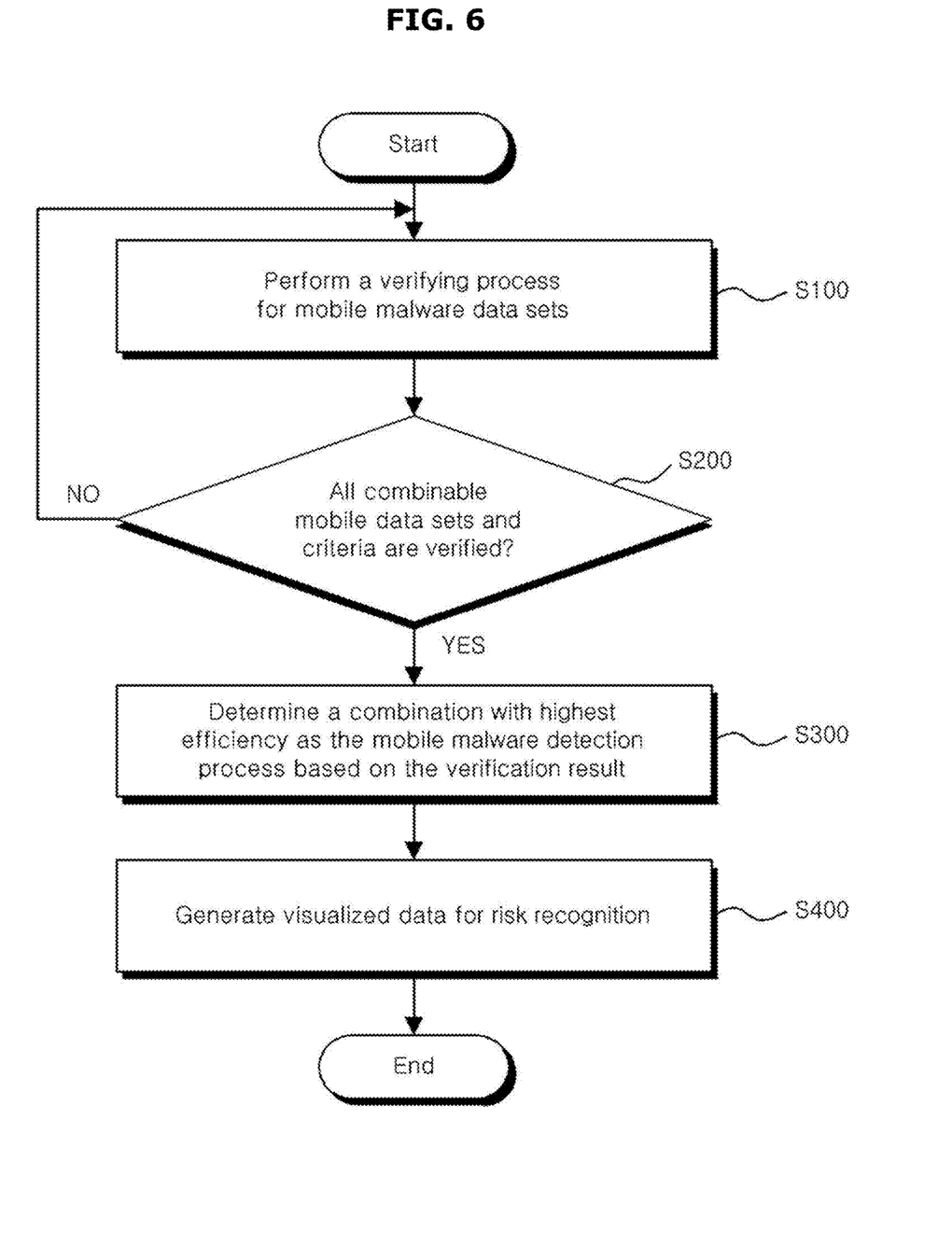
FIG. 6 is a flowchart for illustrating a method for managing a risk of a malware behavior in a mobile operating system according to an embodiment of the present disclosure.

FIG. 6 is a flowchart for illustrating a method for managing a risk of a malware behavior in a mobile operating system according to an embodiment of the present disclosure.

Figure 7:
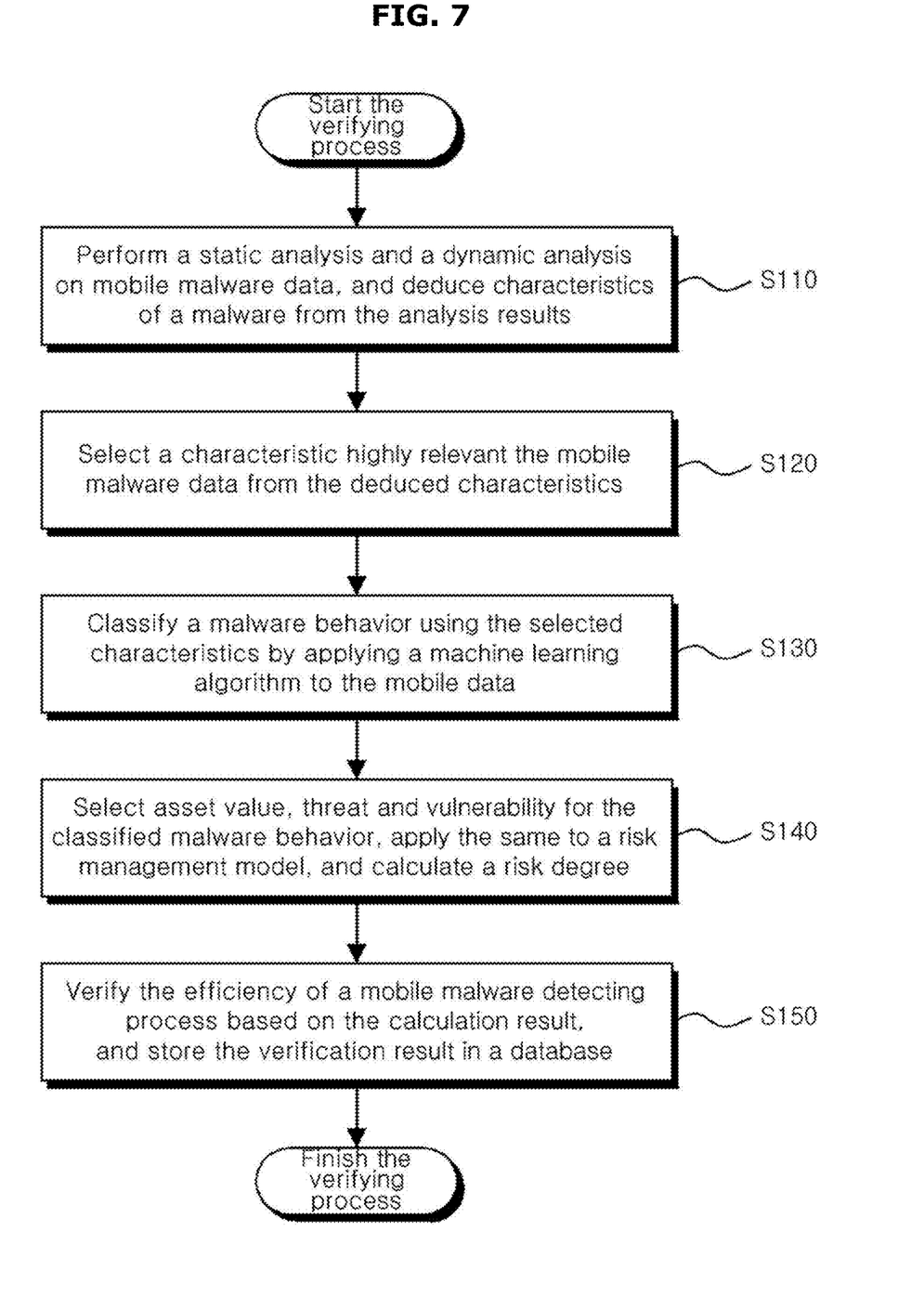
FIG. 7 is a flowchart for illustrating a process (S100) for verifying a mobile data set in the measuring method of FIG. 6 in detail.

FIG. 7 is a flowchart for illustrating a process (S100) for verifying a mobile data set in the measuring method of FIG. 6 in detail.

Referring to FIGS. 6 and 7, a process (S100) is to verify the efficiency of a detection process for a mobile malware data set, and the verifying process includes the steps of analysis and characteristic deduction (S110)—characteristic selection (S120)—behavior classification (S130)—risk degree calculation (S140)—efficiency verification (S150).

In the analysis and characteristic deduction step (S110), a static analysis on mobile malware data and a dynamic analysis thereon under a virtual environment are performed, and characteristics of a malware are deduced from the analysis results based on a blacklist such as an indicator of compromise (IOC) derived from an existing mobile malware (S110). A characteristic highly relevant the existing mobile malware is selected from the deduced mobile malware data (S120). At this time, the malware behavior is classified using the selected characteristics by applying a machine learning algorithm to the mobile data (S130).

Asset value, threat and vulnerability are selected for the classified malware behavior and applied to a risk management model, and a main risk group and a secondary risk group are classified to calculate a risk degree (S140). The efficiency of a mobile malware detecting process is verified based on the calculation result in consideration of the time spent for performing a series of works, a used resource, a detection ratio and the like, and the same is stored in a database (S150).

Referring to FIG. 7, the verifying process (S100) is performed for all combinable mobile data sets and criteria (S200). Also, a combination with a highest detection ratio is determined as the mobile malware detection process (S300).

Finally, the risk degree is expressed using ratios, colors, graphs or the like so that the risk degree may be intuitively recognized in the risk management for classifying asset value, threat and vulnerability into a mobile malware risk group (S400).

The method for managing a risk of a malware behavior in a mobile operating system as described above may be implemented in the form of an application or program commands executable by various computer components and be recorded on a computer-readable recording medium. The computer-readable recording medium may include program commands, data files, data structures or the like solely or in combination.

The program commands recorded on the computer-readable recording medium may be specially designed or configured for the present disclosure or known to and available by computer software engineers.

The computer-readable recording medium includes, for example, magnetic media such as a hard disk, a floppy disk and a magnetic tape, optical media such as CD-ROM and DVD, magneto-optical media such as a floptical disk, hardware devices such as ROM, RAM and a flash memory, specially configured to store and perform program commands, or the like.

The program commands include not only machine codes made by a complier but also high-level language codes executable by a computer by using an interpreter. The hardware device may be configured to operate as at least one software module to perform the operations of the present disclosure, or vice versa.

While the present disclosure has been described with reference to the embodiments, it will be understood by those skilled in the art that various changes and modifications can be made without departing from the scope of the present disclosure as set forth in the appended claims.

REFERENCE SIGNS

100: apparatus for managing a risk of a malware behavior in a mobile operating system
110: deducing unit
120: classifying unit
130: calculating unit
140: verifying unit
150: determining unit
160: visualizing unit

What is claimed is:

1. An apparatus for managing a risk of a malware behavior in a mobile operating system, comprising:
    a deducing unit configured to deduce characteristics of a malware from results of a static analysis on mobile malware data and a dynamic analysis thereon under a virtual environment by using a blacklist including an indicator of compromise (IOC) utilized in an existing mobile malware, and then select a characteristic most similar to the mobile malware data among the deduced characteristics;
    a classifying unit configured to classify a malware behavior using the characteristic selected by the deducing unit by applying a machine learning algorithm to mobile data;
    a calculating unit configured to select asset value, threat and vulnerability for the classified malware behavior and apply the selected asset value, threat and vulnerability to a risk management model, and classify a main risk group and a secondary risk group to calculate a risk degree; and
    a verifying unit configured to verify the efficiency of a mobile malware detecting process for a result of the calculating unit and store a verification result in a database.

2. The apparatus for managing a risk of a malware behavior in a mobile operating system according to claim 1, further comprising:
    a determining unit configured to determine a combination with a highest detection ratio as the mobile malware detection process, based on the verification result of the verifying unit for all combinable mobile data sets with different criteria.

3. The apparatus for managing a risk of a malware behavior in a mobile operating system according to claim 1, wherein the asset value selected by the calculating unit includes at least one of a user, an application and a system, which are attack targets defined in the IOC, as an importance of a domain executable by the malware.

4. The apparatus for managing a risk of a malware behavior in a mobile operating system according to claim 1, wherein the threat selected by the calculating unit includes at least one of installation, activation, malicious payload and overview from an attacker, which are possible attacks to the asset value, as malware behavior information to which a weight is endowed by machine learning.

5. The apparatus for managing a risk of a malware behavior in a mobile operating system according to claim 1, wherein the vulnerability selected by the calculating unit includes at least one of cookie information, e-mail information and system information, which are detailed items for criteria of the IOC classified in the asset value, as classification information of specific behaviors on the asset value.

6. The apparatus for managing a risk of a malware behavior in a mobile operating system according to claim 1, further comprising:
a visualizing unit configured to express the risk degree with at least one of ratio, color and graph.

7. A method for managing a risk of a malware behavior in a mobile operating system, comprising:
deducing characteristics of a malware from results of a static analysis on mobile malware data and a dynamic analysis thereon under a virtual environment by using a blacklist including an indicator of compromise (IOC) utilized in an existing mobile malware, and then selecting a characteristic most similar to the mobile malware data among the deduced characteristics;
classifying a malware behavior using the selected characteristic by applying a machine learning algorithm to mobile data;
selecting asset value, threat and vulnerability for the classified malware behavior and applying the selected asset value, threat and vulnerability to a risk management model, and classifying a main risk group and a secondary risk group to calculate a risk degree; and
verifying the efficiency of a mobile malware detecting process for a calculation result and storing a verification result in a database.

8. The method for managing a risk of a malware behavior in a mobile operating system according to claim 7, further comprising:
determining a combination with a highest detection ratio as the mobile malware detection process, based on the verification result for all combinable mobile data sets with different criteria.

9. The method for managing a risk of a malware behavior in a mobile operating system according to claim 7, further comprising:
expressing the risk degree with at least one of ratio, color and graph.

10. A non-transitory computer-readable recording medium storing a computer program for executing a method for managing a risk of a malware behavior in a mobile operating system, the method comprising:
deducing characteristics of a malware from results of a static analysis on mobile malware data and a dynamic analysis thereon under a virtual environment by using a blacklist including an indicator of compromise (IOC) utilized in an existing mobile malware, and then selecting a characteristic most similar to the mobile malware data among the deduced characteristics;
classifying a malware behavior using the selected characteristic by applying a machine learning algorithm to mobile data;
selecting asset value, threat and vulnerability for the classified malware behavior and applying the selected asset value, threat and vulnerability to a risk management model, and classifying a main risk group and a secondary risk group to calculate a risk degree; and
verifying the efficiency of a mobile malware detecting process for a calculation result and storing a verification result in a database.

* * * * *